US007383065B2

(12) United States Patent
Skinner et al.

(10) Patent No.: US 7,383,065 B2
(45) Date of Patent: *Jun. 3, 2008

(54) WIRELESS TRANSACTION ENABLED HANDHELD COMPUTER SYSTEM AND METHOD

(75) Inventors: Craig S. Skinner, Snohomish, WA (US); David Mai, Bellevue, WA (US); Edward Joseph Vertatschitsch, Bellevue, WA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/476,419

(22) Filed: Jun. 28, 2006

(65) Prior Publication Data

US 2007/0099676 A1 May 3, 2007

Related U.S. Application Data

(63) Continuation of application No. 09/865,657, filed on May 25, 2001, now Pat. No. 7,096,049.

(51) Int. Cl.
*H04Q 7/32* (2006.01)

(52) U.S. Cl. .................. 455/573; 455/572; 455/550.1; 455/556.1; 455/557; 455/556.2; 455/343.1; 320/114; 320/115; 320/113; 320/108

(58) Field of Classification Search ................ 455/573, 455/572, 343.1, 343.2, 343.3, 343.4, 343.5, 455/343.6, 550.1, 569.1, 569.2, 557, 403, 455/422.1, 412.1, 412.2, 414.1, 344, 347, 455/349, 351, 500, 517; 320/125, 160, 107, 320/108, 113, 114, 115; 709/250, 218, 217, 709/219

See application file for complete search history.

(56) References Cited

U.S. PATENT DOCUMENTS 4,684,870 A 8/1987 George et al.
5,010,547 A 4/1991 Johnson et al.
5,012,219 A 4/1991 Henry
5,075,684 A 12/1991 DeLuca
5,359,317 A 10/1994 Gomez et al.
5,394,140 A 2/1995 Wong et al.
5,430,436 A 7/1995 Fennell
5,444,867 A 8/1995 Marui et al.
5,612,682 A 3/1997 DeLuca et al.
5,650,776 A 7/1997 Mitchell et al.
5,705,995 A 1/1998 Laflin et al.
5,771,471 A 6/1998 Alberth et al.
5,903,852 A 5/1999 Schaupp, Jr. et al.
5,949,216 A 9/1999 Miller
5,958,006 A 9/1999 Eggleston et al.

(Continued)

OTHER PUBLICATIONS

Installation and Getting Started Guide, Blackberry Enterprise Edition (Last revised Jan. 26, 2001), © 2001 Research in Motion Limited, 295 Phillip Street, Waterloo, Ontario, Canada N2L 3W8, pp. 21-31.

*Primary Examiner*—Keith Ferguson
(74) *Attorney, Agent, or Firm*—Foley & Lardner LLP

(57) ABSTRACT

A handheld computer system is disclosed. The handheld computer system includes a housing, a display supported by the housing, and a processor coupled to the display. The handheld computer system also includes a rechargeable battery configured to power the processor and the display. Further, the handheld computer system includes a recharging connector coupled to the rechargeable battery. Further still, the handheld computer system includes a recharger coupled to the recharging connector. Yet further still, the handheld computer system includes a radio frequency transceiver coupled to the processor and powerable by the battery when the battery has a charge above a predetermined low level, the transceiver configured to send and receive data while the battery charge is below the low level and the charger provides charge to the rechargeable battery and to the transceiver.

20 Claims, 2 Drawing Sheets

U.S. PATENT DOCUMENTS 6,157,630 A    12/2000  Adler et al.
6,256,518 B1    7/2001  Buhrmann
6,323,775 B1   11/2001  Hansson 2002/0078248 A1   6/2002  Janik et al.
2002/0133565 A1   9/2002  Huat
2002/0163778 A1  11/2002  Hazzard et al.
2002/0193152 A1  12/2002  Soini et al.

WIRELESS TRANSACTION ENABLED HANDHELD COMPUTER SYSTEM AND METHOD

CROSS-REFERENCE TO RELATED APPLICATIONS

This application is a continuation of U.S. application Ser. No. 09/865,657, filed May 25, 2001 now U.S. Pat. No. 7,096,049 and entitled "Wireless Transaction Enabled Handheld Computer System and Method," the content of which is hereby incorporated by reference.

BACKGROUND

Handheld computing devices, "palmtops," "palmhelds," personal digital assistants (PDAs), or handheld computers typically weigh less than a pound and fit in a pocket. These handhelds generally provide some combination of personal information management, database functions, word processing, and spreadsheets as well as voice memo recording, wireless e-mail, and wireless telephony functions. Because of the small size and portability of handhelds, strict adherence to hardware constraints such as battery hardware constraints must be maintained. It is conventional to include a rechargeable battery in the handheld unit and further to include a recharging connector that is coupleable to a power source to enable battery recharging.

Handheld computing devices may include rechargeable batteries used to power the handheld computer and other on-board devices such as a wireless phone or wireless transceiver. The user must periodically recharge the rechargeable batteries by plugging the unit directly into a battery recharger or by placing the handheld computing device into a synchronization cradle that also functions as a battery charger.

Handheld computing devices that utilize radio frequency (RF) connections for data or voice communications require power for the RF transceiver modules that require substantial signal amplification for transmission and further require transceiver power for reception. Conventionally, handheld computing devices do not allow receiving of RF transmissions and/or the performance of RF transmissions when the battery has a charge that is below a minimum level. Accordingly, when a battery charge falls below a low minimum level communications are disabled. In such a case where the battery charge is too low for wireless communications, a user may plug the battery and/or the device into a recharger. The rechargeable battery will be charged during the time in which the handheld computer is connected to the recharger, but the wireless communications will be disabled during the charging period.

Accordingly, there is a need for a handheld computer in which wireless communications are enabled when the computer battery is below a low minimum charge level and when the handheld computer is receiving power from a power source for battery recharging, at least some of the power being used to power the RF transceiver. Further, there is a need for a handheld computer that allows RF transceiver operations when the handheld computer battery is being recharged.

The teachings herein below extend to those embodiments that fall within the scope of the appended claims, regardless of whether they accomplish one or more of the above-mentioned needs.

SUMMARY

An exemplary embodiment relates to a handheld computer system. The handheld computer system includes a housing, a display supported by the housing, and a processor coupled to the display. The handheld computer system also includes a rechargeable battery configured to power the processor and the display. Further, the handheld computer system includes a recharging connector coupled to the rechargeable battery. Further still, the handheld computer system includes a recharger coupled to the recharging connector. Yet further still, the handheld computer system includes a radio frequency transceiver coupled to the processor and powerable by the battery when the battery has a charge above a predetermined low level, the transceiver configured to send and receive data while the battery charge is below the low level and the charger provides charge to the rechargeable battery and to the transceiver.

Another exemplary embodiment relates to a method of transmitting data over a radio frequency (RF) link from a handheld computer having a low battery charge. The method includes providing the handheld computer with a rechargeable battery having a relatively low charge. The method also includes coupling the handheld computer to a recharger. Further, the method includes providing power from the charger to a transceiver of the handheld computer while the handheld computer is coupled to the recharger. Further still, the method includes establishing an RF link using the transceiver.

Yet another exemplary embodiment relates to a handheld computer. The handheld computer includes a housing, a display supported by the housing, a processor coupled to the display, and a rechargeable battery configured to power the processor and the display. The handheld computer also includes a recharging connector coupled to the rechargeable battery. Further the handheld computer includes a radio frequency (RF) transceiver coupled to the processor and powerable by the battery when the battery has a charge above a predetermined low level, the transceiver configured to send and receive data while the battery charge is below the low level and the charging connector receives power from a power source and provides power to the rechargeable battery and to the transceiver.

Yet still another exemplary embodiment relates to a handheld computer. The handheld computer includes an expansion module including a rechargeable battery and a radio frequency (RF) transceiver, the battery configured to power the transceiver when the battery has a charge above a predetermined low level. The handheld computer also includes a processor, a display, and a module connector configured to couple to the expansion module. The RF transceiver is configured to send and receive data while the battery charge is below the low level and the module receives power from a power source and provides power to the rechargeable battery and to the transceiver.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
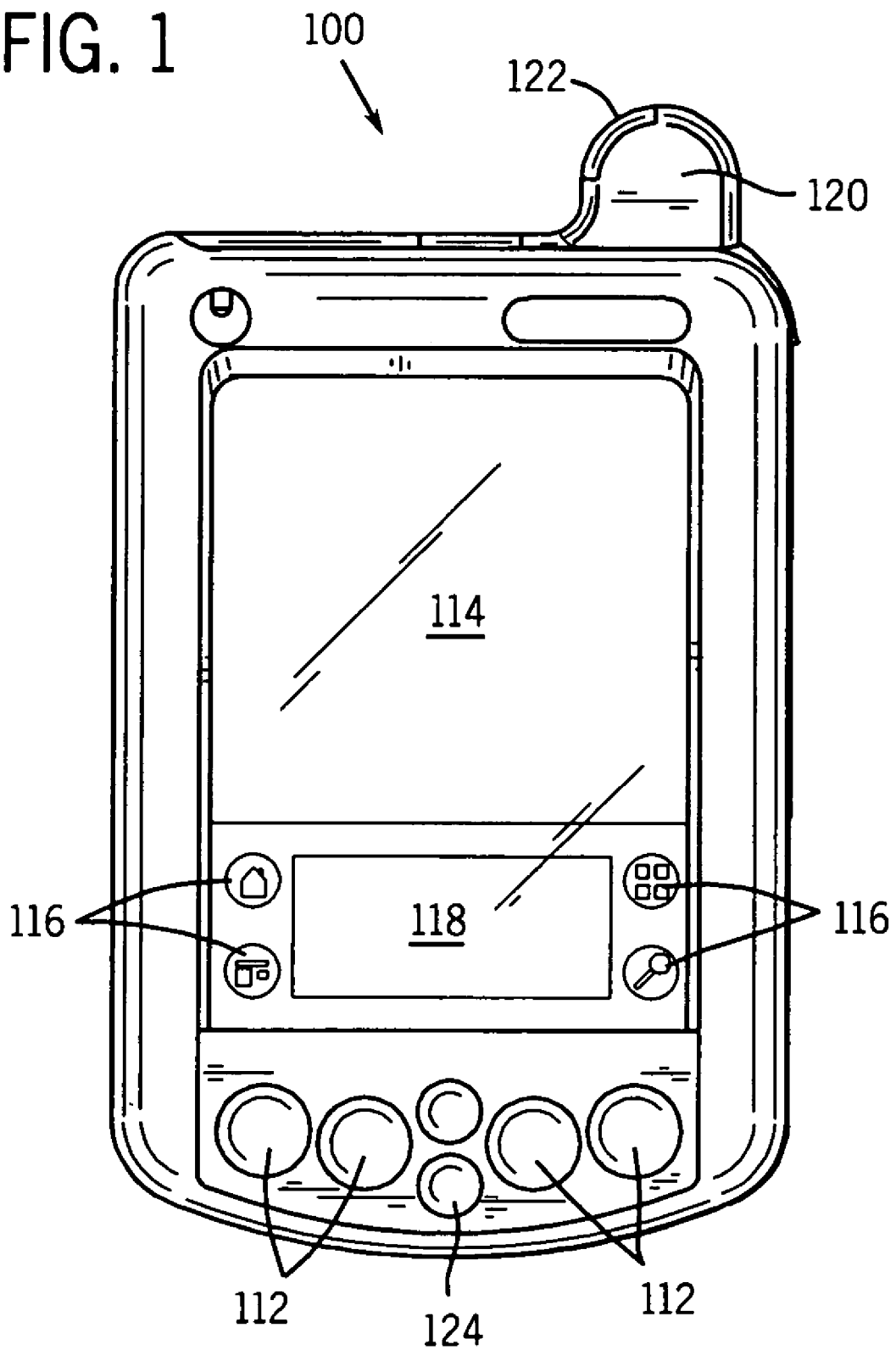
FIG. 1 is an exemplary front elevation view of a handheld computer.

Referring to FIG. 1, a handheld computer 100 is depicted according to an exemplary embodiment. Handheld computer 100 may include Palm style computers manufactured by Palm, Inc., of Santa Clara, Calif. Other exemplary embodiments may include Windows CE handheld computers, or other handheld computers and personal digital assistants, as well as mobile telephones, and other mobile computing devices.

Preferably, handheld computer 100 includes interactive hardware and software that performs functions such as maintaining calendars, phone lists, task lists, note pads, calculator applications, spreadsheets, games, and other applications capable of running on a computing device. Further, handheld computer 100 may be configured for such functions as voice memo recording and playback as well as communications network connectivity, internet connectivity, wireless messaging, e-mail, always-on e-mail, and wireless telephony.

Handheld computer 100, depicted in FIG. 1 includes a plurality of input function keys 112 and a display 114 having graphical user interface features. Display 114 may be provided with a touch screen interface that allows a user to select and alter displayed content using a pointer, such as but not limited to a stylus, a pen tip, a fingertip, or other pointing devices.

Referring again to FIG. 1, in an exemplary embodiment, display 114 also includes a Graffiti™ (or other handwriting recognition software) writing section 118 for tracing alphanumeric characters as input. A plurality of input icons 116 for performing automated or preprogrammed functions may be provided on a portion of display 114.

In an exemplary embodiment, handheld computer 100 may include an integrated antenna 120 configured to transmit and receive wireless communication signals, such as, but not limited to, cellular telephone communication signals and other radio frequency (RF) communications signals using an RF transceiver. Antenna 120 may further include an indicator light 122 integrated into antenna 120 for indicating the transmission and reception of wireless communication signals. Further, light 122 may be used to indicate other states of handheld computer 100.

In an exemplary embodiment, handheld computer 100 also includes navigation buttons 124 that may be utilized for navigating or scrolling of information displayed on display 114. Further, navigation buttons 124 may be programmed for other uses depending on the application running on handheld computer 100. Handheld computer 100 may be used for any of a variety of wireless communications, including, but not limited to, communications with the World Wide Web, mobile telephone communications, e-mail communications, etc.

Figure 2:
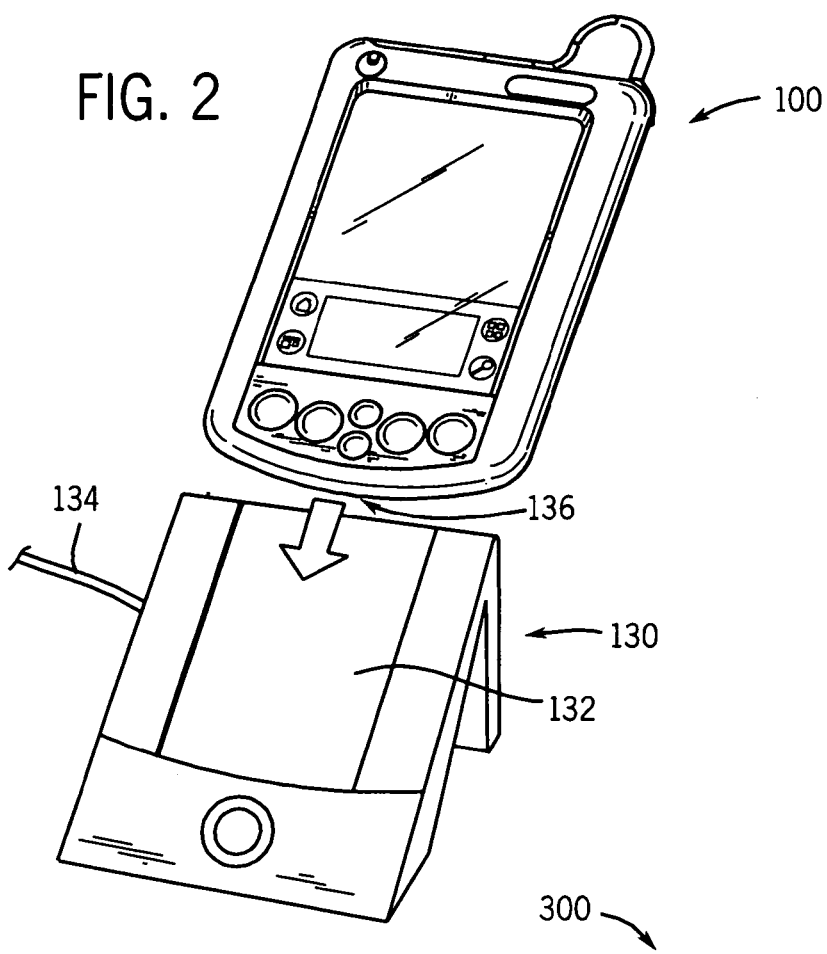
FIG. 2 is a perspective view of a handheld computer and a battery charging cradle.

Referring to FIG. 2, in an exemplary embodiment, handheld computer 100 may be coupled to a cradle, such as a synchronization cradle 130. Cradle 130 may include a platform 132 configured to receive handheld computer 100, and a power or data cord 134 (which, in an exemplary embodiment may be, but is not limited to a universal serial bus (USB) cord) that may be coupled to a personal computer and a wall outlet to supply power to cradle 130 (alternatively, cradle 130 may draw power through the data cord from the personal computer).

Handheld computer 100 further includes a battery used to power the various features of handheld computer 100. The battery may be a rechargeable lithium polymer battery, lithium ion battery, or any other type of battery applicable to a handheld device that requires periodic charging from an external power source. In an exemplary embodiment the battery may have a maximum voltage of 4.2V and provide power to an RF transceiver of handheld computer 100 when the charge is in the range of 3.6V to 4.2V, however, any applicable maximum and minimum voltages may be applied depending on the hardware and design specifications.

Handheld computer 100 may be electrically coupled to cradle 130 via any of a variety of connectors, including but not limited to a universal connector (which may be a pinned connector, in an exemplary embodiment located adjacent the bottom edge of handheld computer 100) in an exemplary embodiment. When handheld computer 100 is electrically connected to cradle 130, the battery may be charged. In a further exemplary embodiment, the battery may be charged when handheld computer 100 is coupled to an AC power cord that functions as a battery charger.

Figure 3:
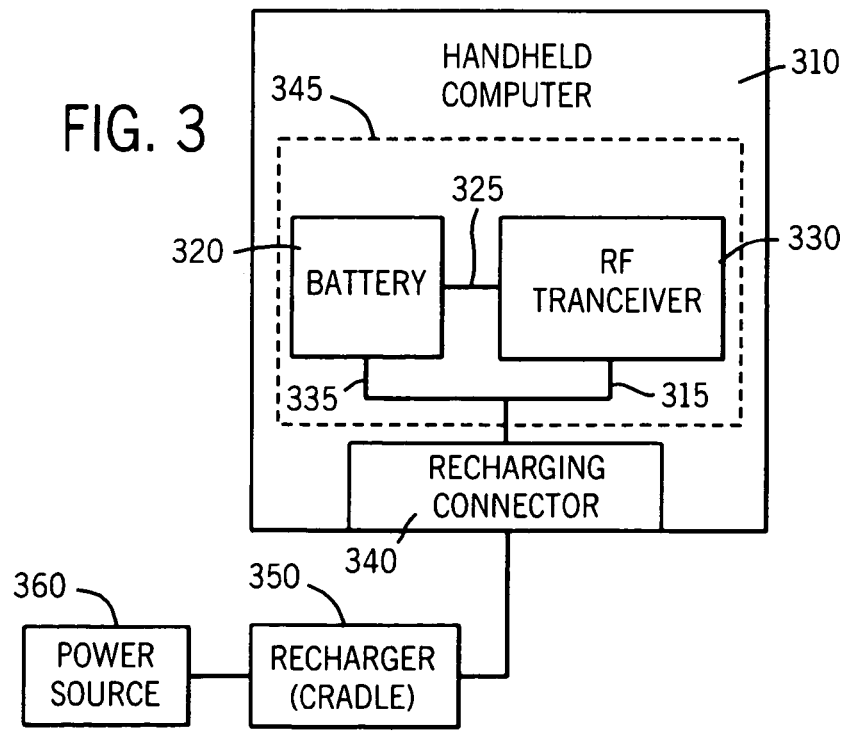
FIG. 3 is a block diagram of a handheld computer and recharging system.

Referring now to FIG. 3, an exemplary block diagram 300 of a handheld computer 310 and charging system is depicted. Handheld computer 310 includes a battery 320, an RF transceiver 330, and a recharging connector 340. Recharging connector 340 is selectively coupled to a recharger 350 (or multipurpose cradle such as but not limited to a synchronization and recharging cradle). Recharger 350 receives power, and optionally data, from a power source 360, which may be but is not limited to a personal computer or an electrical outlet.

When the user desires to charge the battery of handheld computer 310, handheld computer 310 may be connected to recharger 350, which will permit the charging of the battery. Conventionally, when handheld computer 310 has a low battery status, or when the battery charge has dropped below a low minimum level, RF transceiver 330 is unable to or is not permitted to function. Accordingly, any data intended for handheld computer 310 is not received by RF transceiver 330 and any requests for transmission of data by the user of handheld computer 310 are denied.

In a conventional application a user would couple handheld computer 310 to recharger 350 and begin the charging process, all the while the RF transceiver remained disabled.

In an exemplary embodiment, handheld computer 310 includes a connection, such as but not limited to connection 315 that is configured to provide power to RF transceiver 330 while battery 320 is charging. Accordingly, because of a power connection, such as connection 315, a user of handheld computer 310 is able to transmit information while battery 320 is charging. Further, handheld computer 310 and transceiver 330 are configured to receive data while, battery 320 is charging because charger 315 includes connection 315 which supplies power to RF transceiver 330. In an alternative embodiment, a power supply connection 325 may be provided from battery 320, in which case power delivered to battery 320 over connection 335 may be provided to RF transceiver 330 via battery 320, while battery 320 is charging. Accordingly, a user may utilize RF transceiver 330 while charging battery 320, even if battery 320 has a charge below a low minimum level. Further, as may be desired, for example, in a device configured for an "always-on" e-mail application, RF transceiver 330 will continue to receive e-mail or be enabled to provide other types of RF communications while battery 320 is being charged.

In another exemplary embodiment the battery, such as battery 320 may be a rechargeable battery for an optional expansion module 345 utilizing an RF transceiver. Such an expansion module may be, but is not limited to a cell phone expansion module, a wireless networking module, and the like. Accordingly, the RF transceiver of expansion module 345 having a rechargeable battery may be enabled when drawing power from a charger, even when the battery of expansion module 345 has a charge below a minimum level.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A mobile computing device, comprising:
   a housing;
   a display supported by the housing;
   a processor coupled to the display;
   a rechargeable battery configured to power the processor and the display;
   a wireless transceiver coupled to the processor; and
   a recharging connector coupled to the rechargeable battery and the wireless transceiver;
   wherein the transceiver is powerable by the battery when the battery has a charge above a predetermined low level, and the transceiver is configured to send and receive data while the battery charge is below the low level and the rechargeable battery and the transceiver receive power via the recharging connector, the low level being a level below which the battery is unable to power the transceiver.

2. The mobile computing device of claim 1, wherein the mobile computing device is a handheld computer.

3. The mobile computing device of claim 2, wherein the processor is configured to support an electronic calendar application.

4. The mobile computing device of claim 2, wherein the processor is configured to support a spreadsheet application.

5. The mobile computing device of claim 1, wherein the data includes at least one of an email communication and a wireless telephone communication.

6. The mobile computing device of claim 1, wherein the recharging connector is configured to couple to and receive power from a recharger for the mobile computing device.

7. The mobile computing device of claim 6, wherein the recharger is a synchronization cradle.

8. An expansion module comprising:
   a rechargeable battery;
   a wireless transceiver powerable by the battery; and
   a recharging connection;
   wherein the recharging connection supplies power to the battery and the transceiver from a power source such that the transceiver is configured to send and receive data when the power level of the battery is at a level too low to enable the transceiver.

9. The expansion module of claim 8, wherein the wireless transceiver is an RF transceiver.

10. The expansion module of claim 9, wherein the expansion module is an expansion module for a handheld computer.

11. The expansion module of claim 8, wherein the recharging connection receives power via the handheld computer.

12. The expansion module of claim 11, wherein the expansion module is an expansion module for a cellular phone.

13. The expansion module of claim 8, wherein the recharging connection receives power via the cellular phone.

14. The expansion module of claim 8, wherein the expansion module is a wireless networking module.

15. The expansion module of claim 8, wherein the recharging connection provides power to the transceiver via the battery of the expansion module.

16. The expansion module of claim 8, wherein the recharging connection provides power directly to the transceiver.

17. A method of transmitting a wireless communication from an expansion device having a low battery charge, comprising:
   providing an expansion device with a rechargeable battery having a low charge, the low charge being too low to transmit information using a wireless transceiver of the expansion device;
   coupling the expansion device to a power source; and
   establishing a wireless link using the transceiver while providing power to the transceiver and the battery from the power source and while the battery has the low charge.

18. The method of claim 17, wherein the expansion device is configured to be coupled to a handheld computer.

19. The method of claim 17, wherein the wireless communication includes an e-mail message.

20. The method of claim 17, wherein the wireless communication includes a cellular telephone call.

* * * * *